(12) United States Patent
Yamamoto et al.

(10) Patent No.: US 8,474,810 B2
(45) Date of Patent: Jul. 2, 2013

(54) REFLECTIVE PHOTOSENSOR AND IMAGE FORMING DEVICE INCORPORATING THE SAME

(75) Inventors: Norifumi Yamamoto, Yokohama (JP); Masahiko Sato, Sagamihara (JP); Toshio Yanata, Ebina (JP); Masafumi Hashiguchi, Yokohama (JP); Masataka Akaishi, Ebina (JP); Sohichiroh Naka, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/534,369

(22) Filed: Jun. 27, 2012

(65) Prior Publication Data

US 2013/0001857 A1    Jan. 3, 2013

(30) Foreign Application Priority Data

Jun. 28, 2011    (JP) .................................. 2011-142680

(51) Int. Cl.
*B65H 5/00*    (2006.01)
(52) U.S. Cl.
USPC .................. 271/10.02; 271/10.03; 271/110; 271/258.01; 271/265.01
(58) Field of Classification Search
USPC ............. 271/10.02, 10.03, 10.09, 10.11, 121, 271/110, 258.01, 265.01; 250/206, 206.1, 250/214 R; 313/523
See application file for complete search history.

(56) References Cited

U.S. PATENT DOCUMENTS

| 4,037,941 | A | * | 7/1977 | Belleson et al. ........... 359/218.1 |
| 6,330,377 | B1 | | 12/2001 | Kosemura |

FOREIGN PATENT DOCUMENTS

| JP | 05-055635 A | 3/1993 |
| JP | 2000-081524 A | 3/2000 |
| JP | 2005-012022 A | 1/2005 |
| JP | 2010-235313 A | 10/2010 |

\* cited by examiner

*Primary Examiner* — David H Bollinger
(74) *Attorney, Agent, or Firm* — Harness, Dickey & Pierce, P.L.C.

(57) ABSTRACT

A reflective photosensor detects a target object. The photosensor includes a transparent circuit board, a light emitter and a light receiver on one surface of the circuit board, including a light emitting element and a light receiving element, respectively, and disposed so that the light emitting element and the light receiving element face the one surface, a concave portion on the other surface of the circuit board, including a first refractive face to oppose the light emitting element and refract light from the light emitting element to the light receiving element and a second refractive face to oppose the light receiving element and refract, to the light receiver, a component of the light refracted by the first refractive face and specularly reflected by the target object.

6 Claims, 7 Drawing Sheets

REFLECTIVE PHOTOSENSOR AND IMAGE FORMING DEVICE INCORPORATING THE SAME

CROSS REFERENCE TO RELATED APPLICATION

The present application is based on and claims priority from Japanese Patent Application No. 2011-142680, filed on Jun. 28, 2011, the disclosure of which is hereby incorporated by reference in its entirety.

BACKGROUND OF THE INVENTION

1. Field of the Invention

The present invention relates to a reflective photosensor for detecting the position of a target object such as a sheet of paper and an image forming device incorporating such a reflective photosensor.

2. Description of the Related Art

Japanese Patent Application Publication No. 2010-235313 discloses an image forming device partially shown in FIG. 11, for example. It includes a photosensor 832 with a filler 832a and a transmissive photosensor 832b to detect the position of a paper sheet P carried by a feed roller 802 and else. The filler 832a is arranged on the carrier path of the paper sheet P and hit and swung by the paper sheet P. The transmissive photosensor 832b includes a light emitter and a light receiver facing each other so that the swung filler 832a shields light traveling from the light emitter to the light receiver. The filler photosensor 832 is configured to detect the position of the carried paper sheet P from shielded or unshielded light.

Such a filler photosensor 832 faces problems that since the speed at which the paper sheet P is carried is restricted by the swing speed of the filler 832a, it is difficult to increase it, and that the paper sheet P may hit the filler 832a and the tip end thereof may be damaged.

In view of the above problems, Japanese Patent Application Publication No. 5-55635 discloses an image forming device with a reflective photosensor in replace of a filler photosensor as shown in FIG. 12, for example. A reflective photosensor 901 includes a transparent circuit board 902 and a light emitter 904 with a light emitting element 904a and a light receiver 905 with a light receiving element 905a on one surface 902a of the circuit board 902. Both the light emitting element 905a and light receiving element 905b face the one surface 902a. Thus, the light emitter 904 emits light K to the paper sheet P through the circuit board 902 and the light receiver 905 receives light components reflected by the paper sheet P through the circuit board 902.

The light K emitted from the light emitter 904 is received by the light receiver 905 when the paper sheet P is in front of the reflective photosensor 901 and not received when the sheet is not in front of the reflective photosensor 901. Accordingly, this reflective photosensor 901 can detect the position of the carried paper sheet P in non-contact manner from the receipt or non-receipt of the light K by the light receiver 905. Without a moving element as the filler, it is possible to carry the paper sheet P at a higher speed and prevent it from being damaged.

However, there is a problem with the reflective photosensor 901 in low detection accuracy since the light receiving element 905a receives, off the axis, the light components K in a low amount diffusely reflected by the paper sheet P. This is due to a parallel relation of the axes of the light emitting element 904a and light receiving element 905a both disposed to face the one surface 902a. A lens element or a cover can be additionally provided to change the traveling direction of light K and enable the light receiving element 905a to receive light specularly reflected by the paper sheet P. However, this leads to increasing the outer form of the reflective photosensor.

SUMMARY OF INVENTION

The present invention aims to provide a reflective photosensor which can improve the accuracy at which the position of a target object is detected without an additional lens element as well as an image forming device incorporating such a reflective photosensor.

According to one aspect of the present invention, a reflective photosensor to detect a target object, includes a transparent circuit board, a light emitter and a light receiver on one surface of the circuit board, including a light emitting element and a light receiving element, respectively, and disposed so that the light emitting element and the light receiving element face the one surface, a concave portion on the other surface of the circuit board, including a first refractive face to oppose the light emitting element and refract light from the light emitting element to the light receiving element and a second refractive face to oppose the light receiving element and refract, to the light receiver, a component of the light refracted by the first refractive face and specularly reflected by the target object.

BRIEF DESCRIPTION OF THE DRAWINGS

Features, embodiments, and advantages of the present invention will become apparent from the following detailed description with reference to the accompanying drawings.

DETAILED DESCRIPTION OF PREFERRED EMBODIMENTS

Figure 1:
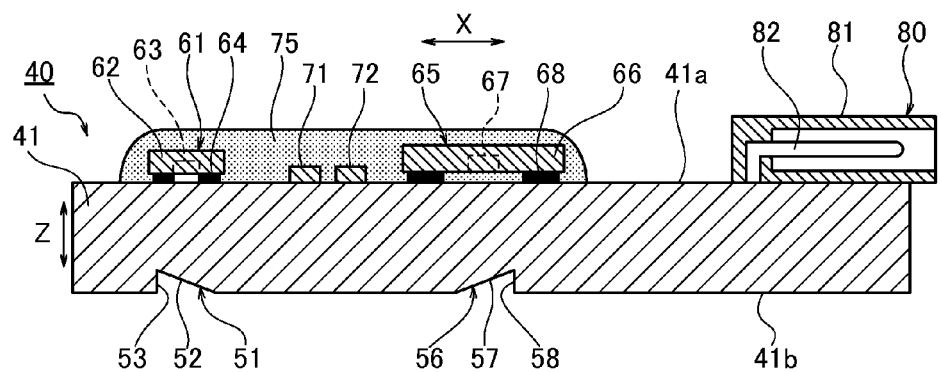
FIG. 1 is a cross section view of a reflective photosensor according to one embodiment of the present invention.

Hereinafter, embodiments of the present invention will be described in detail with reference to the accompanying drawings. Wherever possible, the same reference numbers will be used throughout the drawings to refer to the same or like parts.

First Embodiment

A reflective photosensor according to the present embodiment is described with reference to FIGS. 1 to 7. In the drawings the relative positions of elements are shown using arrows X, Y, Z indicating X, Y, and Z directions orthogonal to one another.

Figure 2:
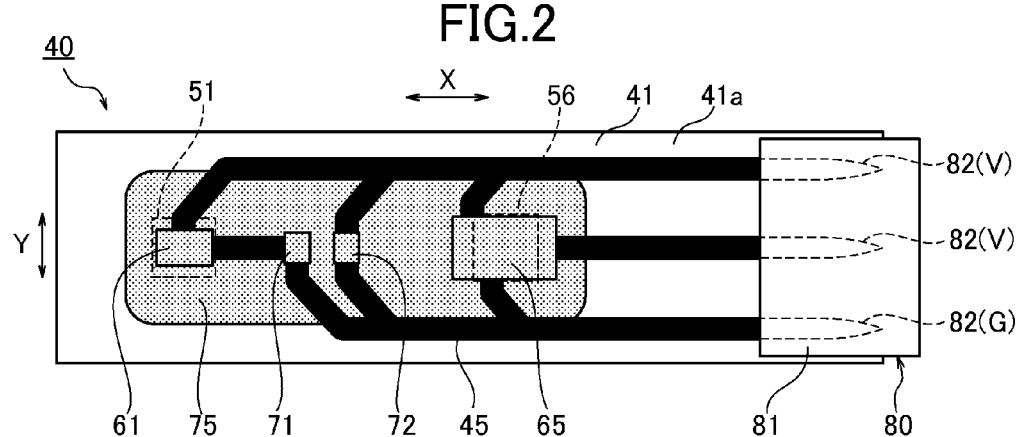
FIG. 2 is a top view of the reflective photosensor in FIG. 1.
Figure 3:
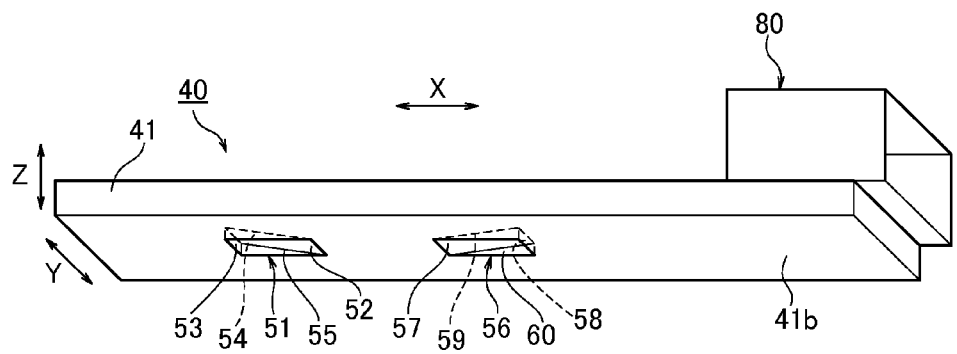
FIG. 3 is a perspective view of the reflective photosensor in FIG. 1 from below.

Referring to FIGS. 1 to 3, a reflective photosensor 40 comprises a circuit board 41, a light emitter 61, a light receiver 65, shield elements 71, 72, a sealing resin 75 and a connector 80.

The circuit board 41 is a belt-like plate made from a light transmissive, transparent, insulated material such as glass, acrylic resin. A wiring pattern 45 is formed on one surface or a top surface 41a of the circuit board 41 by etching a conductive film of aluminum layered thereon by evaporation or else. The wiring pattern 45 electrically connects the light emitter 61, light receiver 65, shield elements 71, 72 and the terminal clamps of the connector 80 with each other. A first concave portion 51 and a second concave portion 56 are provided on the other surface or a bottom surface 41b of the circuit board 41.

The light emitter 61 is made up of an infrared light emitting diode. Alternatively, it can be comprised of any other element as long as it can emit light detectable by the light receiver 65. The light emitter 61 includes a rectangular chip body 62 made from gallium arsenide, a light emitting element 63 at the center of one surface of the chip body 62 and a bump 64 on the circumference of the one surface. The light emitter 61 is mounted on the top surface 41a by flip chip bonding with the bump 64 electrically connected with the wiring pattern 45 and the light emitting element 63 facing the top surface 41a.

The light receiver 65 is made up of a photo transistor to control electric current with infrared light. It can be made of any other element as long as it can detect light from the light emitter 61. The light receiver 65 comprises a rectangular chip body 66 made from silicon, a light receiving element 67 at the center of one surface of the chip body 66, and a bump 68 on the circumference of the one surface. The light receiver 65 is mounted on the top surface 41a by flip chip bonding with the bump 68 electrically connected with the wiring pattern 45 and the light receiving element 67 facing the top surface 41a. In the present embodiment the light emitter 61 and the light receiver 65 are mounted with an interval along the length of the circuit board (arrow X direction) by the flip chip bonding disclosed in Japanese Patent Application Publication No. 2005-12022, for example. The interval helps a leakage of light from the light emitter 61 attenuate and not affect the detection of the light receiver 65 or prevent the occurrence of crosstalk.

The shield elements 71, 72 are each comprised of a mount-type resistance and a condenser and mounted on the top surface 41a by soldering with their terminals electrically connected with the wiring pattern 45. The shield elements 71, 72 are arranged between the light emitter 61 and the light receiver 65 to shield a leakage of light from the light emitter 61 to the light receiver 65.

The sealing resin 75 is made from ABS resin, for example, and layered tightly on the top surface 41a to enclose the light emitter 61, light receiver 65, and shield elements 71, 72. The sealing resin 75 preferably has property to absorb infrared light. In replace of the sealing resin 7, the light emitting and receiving element 61, 65 can be sealed in resin or a case in advance.

The connector 80 is a connector socket including a housing 81 and terminal clamps 82 and mounted on one end of the top surface 41a of the circuit board 41. The terminal clamps 82 include a terminal clamp 82(V) connected with a power source wiring of the wiring pattern 45, a terminal clamp 82(G) connected with a ground wiring, and a terminal clamp 82(O) connected with an output wiring for outputting the signals of the light receiver 65. The terminal clamps 82 are electrically connected with the wiring pattern 45 by soldering.

The first concave portion 51 of the circuit board 41 has a wedge-shaped inner space, and is comprised of four faces, a first refractive face 52 and side faces 53, 54, 55, as shown in FIG. 3. The first concave portion 51 is provided on the bottom surface 41b to oppose the light emitter 61.

The first refractive face 52 opposes the light emitting element 63 and is inclined relative to the bottom surface 41b. Specifically, one end thereof closer to the light receiver 65 continues from the bottom surface 41b and is inclined toward the other end to gradually approach the top surface 41a. Therefore, the first refractive face 52 can refract incident light from the light emitting element 63 to the light receiving element 67 or the second refractive face 57. The first refractive face 52 works as a convex lens to converge incident light. It can be any other lens as long as it converges light.

The side faces 53, 54, 55 are provided between the bottom surface 41b and the first refractive face 52, and approximately orthogonal to the bottom surface 41b.

Likewise, the second concave portion 56 of the circuit board 41 has a wedge-shaped inner space, and is comprised of four faces, a second refractive face 57 and side faces 58, 59, 60, as shown in FIG. 3. The second concave portion 56 is provided on the bottom surface 41b to oppose the light receiver 65.

The second refractive face 57 opposes the light receiving element 67 and is inclined relative to the bottom surface 41b. Specifically, one end thereof closer to the light emitter 61 continues from the bottom surface 41b and is inclined toward the other end to gradually approach the top surface 41a. Therefore, the second refractive face 57 can refract incident light from outside of the circuit board 41 to the light receiving element 67. The second refractive face 57 works as a convex lens to converge incident light. It can be any other lens as long as it converges light.

The side faces 58, 59, 60 are provided between the bottom surface 41b and the second refractive face 57, and approximately orthogonal to the bottom surface 41b.

Next, the operation of the reflective photosensor 40 is described with reference to FIGS. 4 to 5.

Figure 4:
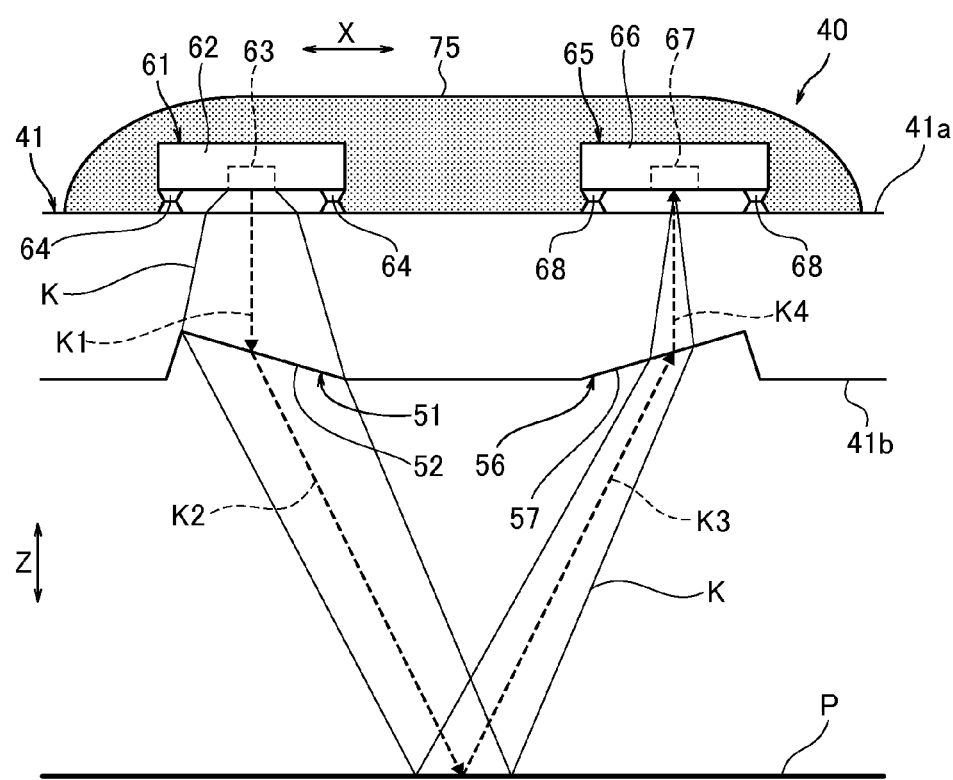
FIG. 4 shows the optical paths of light emitted from a light emitter of the reflective photosensor and received by a light receiver thereof.
Figure 5:
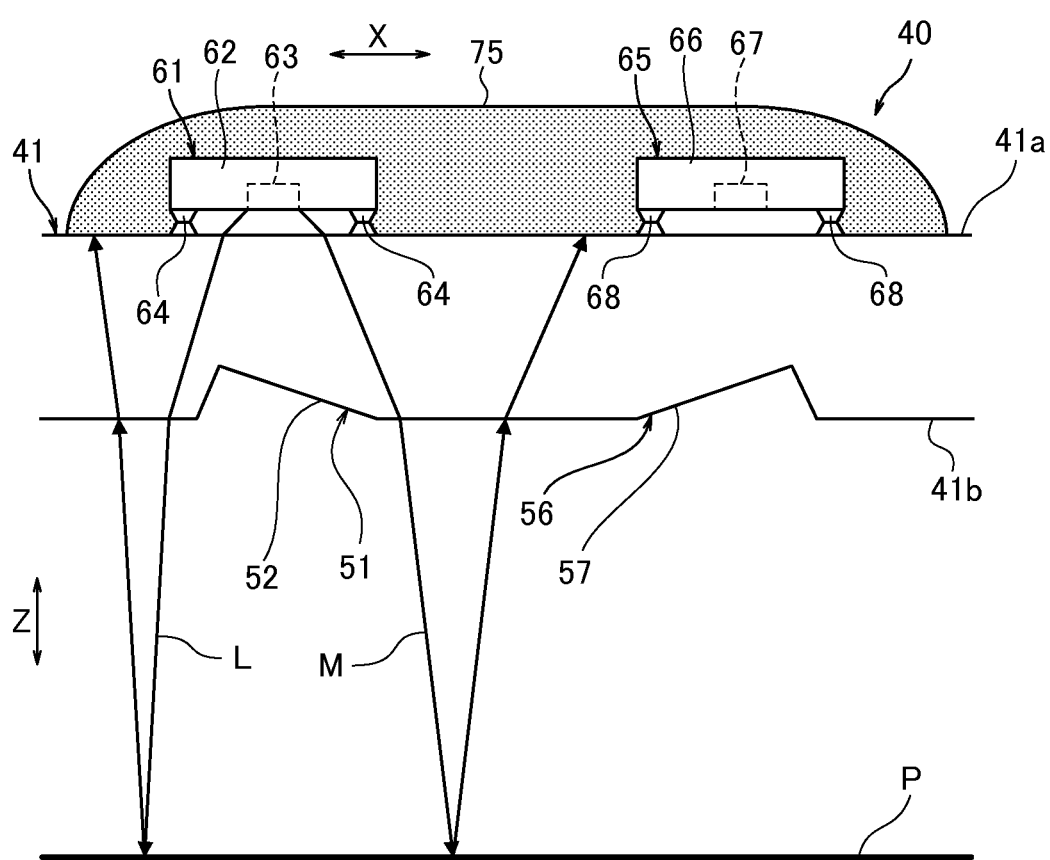
FIG. 5 shows the optical path of a part of the light emitted from the light emitter of the reflective photo sensor and not received by the light receiver thereof.

As shown in FIGS. 4 to 5, the reflective photosensor 40 is arranged so that the bottom surface 41b of the circuit board 41 is parallel to a paper sheet P as a target object with an interval therebetween in Z direction. The interval between the circuit board 1 and the paper sheet P is arbitrarily determined to properly receive light from the light emitter 61 at the light receiver 65, with the structure of the reflective photosensor 40 and the shapes of the first and second refractive faces 52, 57 taken into account.

FIG. 4 shows the paths of light K from the light emitter 61 to be received or detected by the light receiver 65. The optical paths have a predetermined width and lights traveling along the center of the paths are referred to as light beams K1 to K4.

The light beam K1 from the light emitting element 63 enters the top surface 41a of the circuit board 41 orthogonally, travels therethrough and is incident on the first refractive face 52.

The incident light beam K1 is converged by the first refractive face 52, exits from the circuit board 41 to outside and is refracted by the first refractive face 52 to the light receiver 65. The refracted light beam K2 travels toward the paper sheet P.

The light beam K2 is incident on the surface of the paper sheet P and a part thereof is specularly reflected thereby, and the reflected light beam K3 travels toward the second refractive face 57. Another part of the light beam K2 is diffused by the surface of the paper sheet P in different directions (not shown).

Reaching the second refractive face 57, the light beam K3 is converged and refracted thereby to the light receiving element 67 of the light receiver 65. The refracted light beam K4 travels through the circuit board 41 and exits from the top surface 41a and is received by the light receiving element 67 orthogonally.

The light beams K other than the light beams K1 to K4 included in the optical paths are also refracted by the first refractive face 52 to the light receiver 65, specularly reflected by the surface of the paper sheet P, and refracted by the second refractive face 57 to the light receiving element 67.

Further, FIG. 5 shows the optical paths of a part of the light from the light emitter 61 not received by the light receiver 65. The light beams L, M from the light emitter 61 pass through the circuit board 41, are specularly reflected by the surface of the paper sheet P, and enters the bottom surface 41b of the circuit board 41. Then, the light beams L, M incident on the sealing resin 75 layered on the top surface 41a are absorbed thereby. Thereby, re-reflection of extraneous light components by the top surface 41a is preventable.

Thus, according to the present embodiment the first refractive face 52 of the first concave portion 51 is formed to oppose the light emitting element 63 and refract the light therefrom to the light receiving element 67 or second refractive face 57, and the second refractive face 57 of the second concave portion 56 is formed to oppose the light receiving element 67 and refract light components refracted by the first refractive face 52 and specularly reflected by the paper sheet P to the light receiving element 67. By the first refractive face 52, it is made possible to increase the amount of light specularly reflected by the paper sheet P to the light receiving element 67. By the second refractive face 57, the light receiving element 67 can receive the specularly-reflected light components along the axis. Accordingly, the reflective photosensor 40 can receive a larger amount of light properly at the light receiving element 67 and improve the accuracy at which the position of the paper sheet P is detected without provision of an additional lens element protruding from the circuit board 41. Thus, the reflective photosensor 40 in compact size with high detection accuracy can be provided.

Further, the first and second refractive faces 52, 57 are formed to be convex lenses to converge light, so that the light receiving element 67 can receive a larger amount of light from the light emitting element 63, contributing to an improvement in the detection accuracy of the reflective photosensor.

Further, the light emitter 61 and light receiver 65 mounted by the flip chip bonding requires less mounting space on the top surface 41a of the circuit board 41 than those mounted by wire bonding or else, contributing to downsizing the reflective photosensor 40. Moreover, since no wire is needed to connect the circuit board 41 and the light emitter 61 or light receiver 65, wiring resistance can be reduced, further improving the detection accuracy of the reflective photosensor.

Further, the light emitter 61 is configured to emit infrared light and the sealing resin 75 is provided on the top surface 41a of the circuit board 41 to absorb the infrared light. The sealing resin 75 can absorb extraneous light components of the light reflected by the paper sheet P but not received by the light receiving element 67 and traveling to outside of the circuit board 41. It can function to protect the electric elements such as the light emitter 61, light receiver 65 and shield elements 71, 72, and prevent the extraneous light components from being reflected again and received by the light receiving element and prevent a reduction in the detection accuracy.

The shield elements 71, 72 are separately provided between the light receiver 65 and light emitter 61 arranged with an interval. With the interval therebetween, light components traveling from the light emitter 61 directly to the light receiver 65 can be attenuated, and the shield elements can shield the light components not to enter the light receiving element 67 and prevent the occurrence of crosstalk. Thus, the accuracy at which the position of the paper sheet P is detected can be improved.

Figure 6:
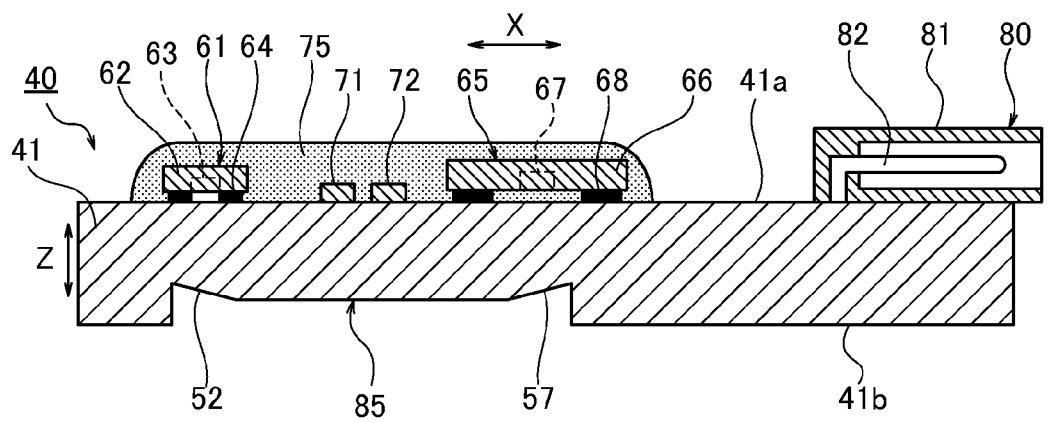
FIG. 6 is a cross section view of another example of the reflective photosensor in FIG. 1.

The present embodiment has described an example of the first and second concave portions 51, 56 including the first and second refractive faces 52, 57, respectively. Alternatively, a single concave portion 85 including the first and second refractive faces 52, 57 can be provided by joining the first and second concave portions 51, 56, as shown in FIG. 6.

Figure 7:
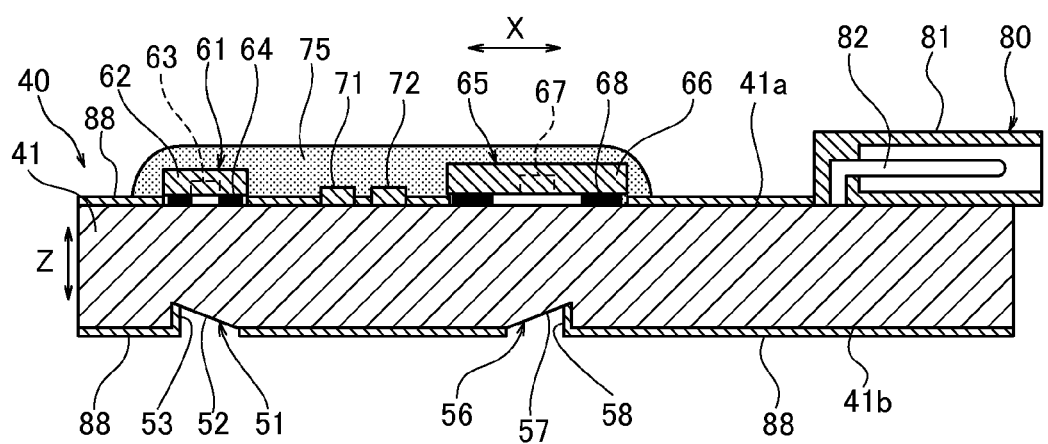
FIG. 7 is a cross section view of still another example of the reflective photosensor in FIG. 1.

Additionally, an anti-reflection element 88 can be coated on the portions of the top and bottom surfaces 41a, 41b of the circuit board 41 other than the portions on which the wiring pattern 45, light emitter 61, light receiver 65, shield elements 71, 72, connector 80, and first and second refractive faces 52, 57 are provided, as shown in FIG. 7. The anti-reflection element 88 can be made from ABS resin, for example to prevent the reflection of infrared light. This leads to further improving the detection accuracy of the reflective photosensor.

Further, either of the light emitter 61 and light receiver 65 can be mounted on the circuit board by flip chip bonding instead of both of them or they can be mounted by any other bonding.

Either of the first and second refractive faces 52, 57 can be a convex lens instead of both of them. Both of the refractive faces can be formed to be a flat face with no converging function. Alternatively, they can be formed to refract, only at the respective central portions, light from the light emitting element 63 to the light receiving element 67, and to refract, at their circumferences, the light from the light emitting element 63 to the places aside from the light receiving element 67.

Second Embodiment

Figure 8:
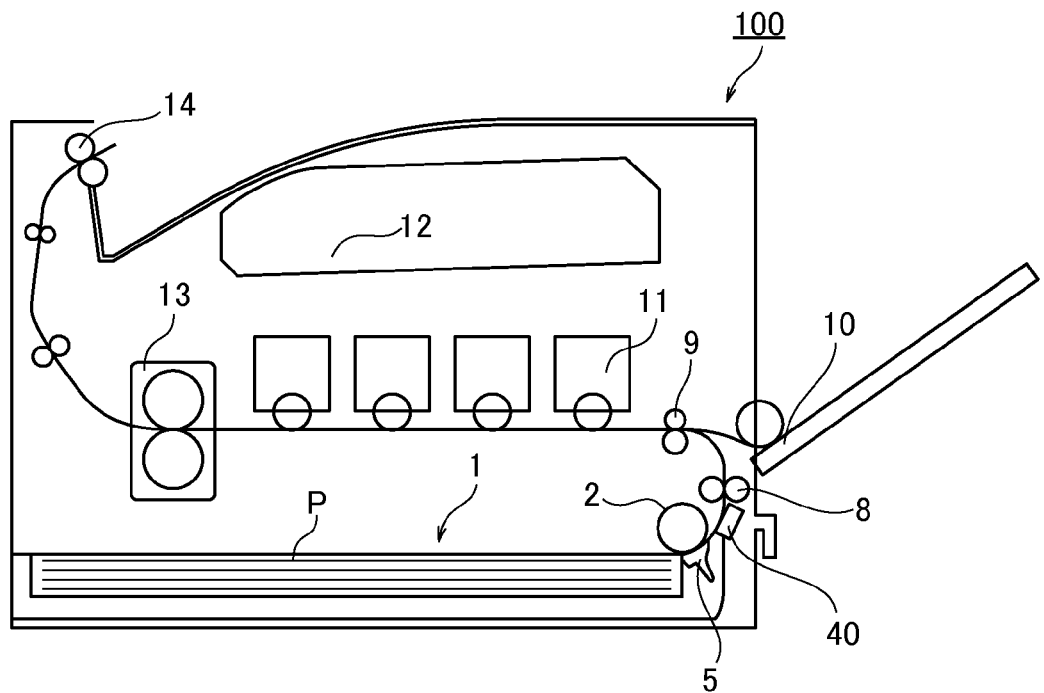
FIG. 8 schematically shows an image forming device according to one embodiment of the present invention.
Figure 9:
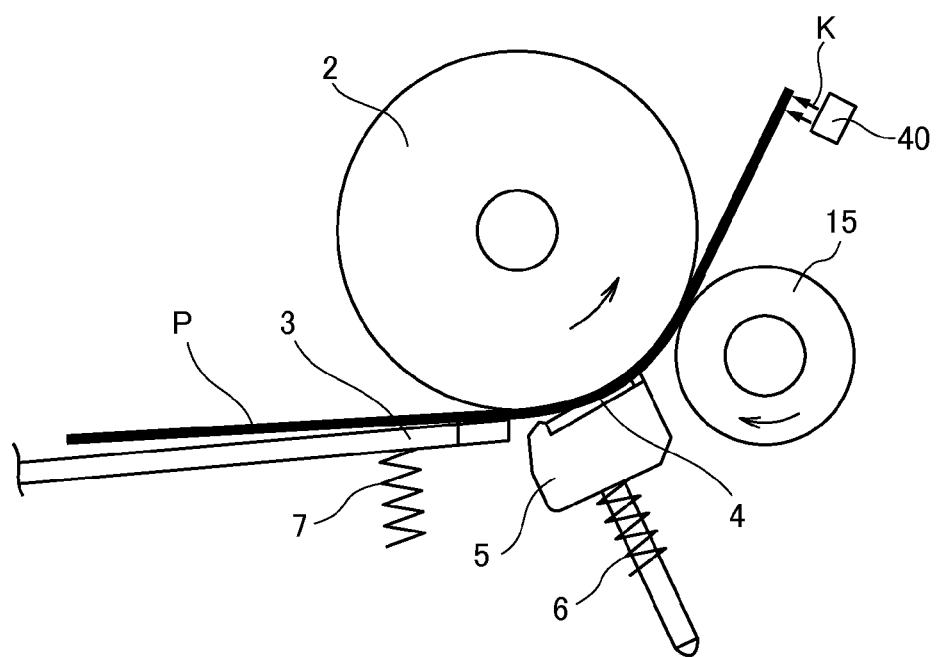
FIG. 9 shows the structure of a paper feeder unit of the image forming device in FIG. 8.
Figure 10:
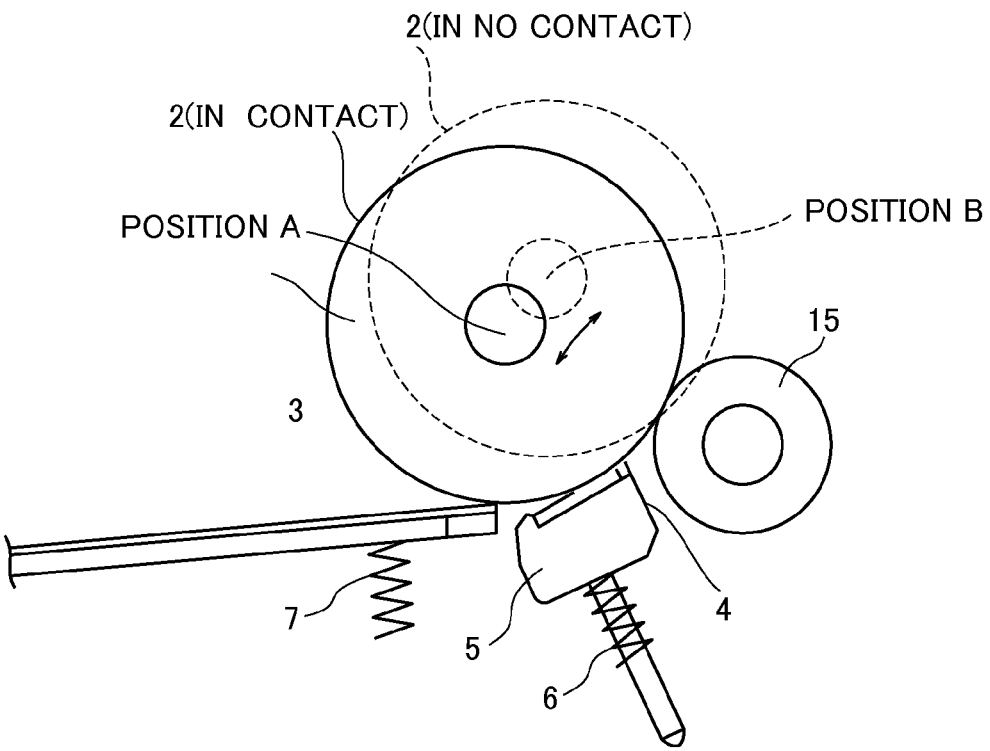
FIG. 10 shows the operation of a feed roller of the paper feeder unit in FIG. 9.
Figure 11:
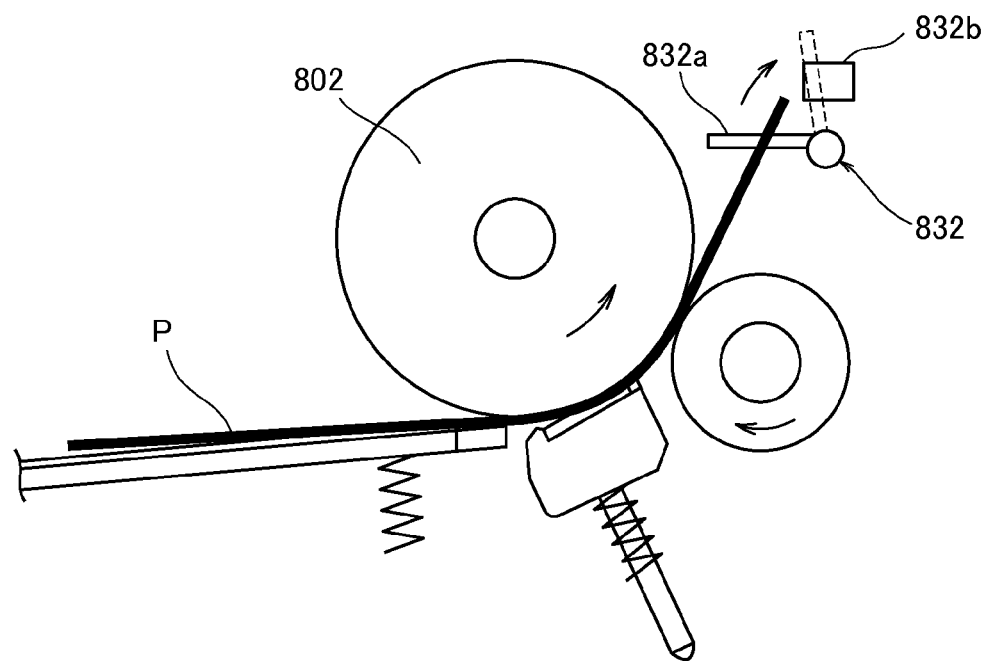
FIG. 11 shows a feed roller of a prior art image forming device.
Figure 12:
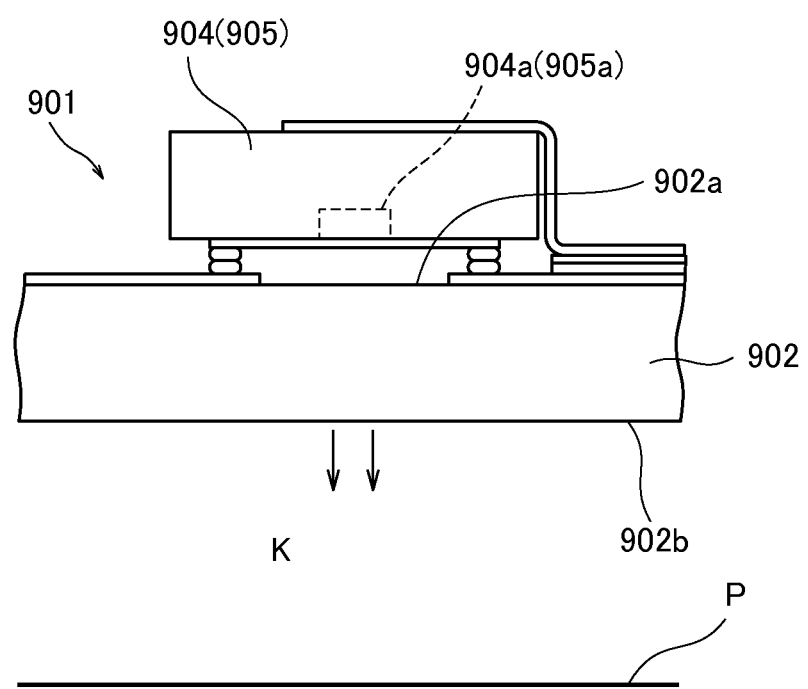
FIG. 12 is a side view of a prior art reflective photosensor.

Referring to FIG. 8 to FIG. 10, the image forming device according to an embodiment of the present invention is described.

In FIG. 8 an image forming device 100 comprises a paper container 1, a feed roller 2 to feed paper sheets P from the paper container 1, an intermediate carrier roller 8 to carry the paper sheets P from the paper container 1 to downstream, and a resist roller pair 9 to adjust the timing at which the paper sheets P from the paper container 1 or a manual paper feeder 10 are carried. It further comprises an laser exposure unit 12 to form electrostatic latent images on photoreceptors, a develop unit 11 to generate toner images from the electrostatic latent images and transfer the toner images onto a paper sheet P having passed the resist roller 9, a fuser unit 13 to fuse the images on the paper sheet P, and a discharge roller 14 to discharge the paper sheet P.

FIG. 9 shows a paper feeder unit of the image forming device 100. In the image forming device 100 the paper plate 3 is pressed from below by an elastic element 7 as a spring and the paper sheet P on the paper plate 3 is biased by the feed roller 2 irrespective of the amount of paper sheets P. Likewise, a separator element 4 on a holder 5 is biased to the feed roller 2 by an elastic element such as a spring, to apply a certain friction force to a paper sheet P carried to the separator element 4 from the paper plate 3. Thereby, it is able to separate, by the friction force, two sheets of paper when carried to a nip portion of the feed roller 2 and the separator element 4.

A carrier roller 15 is provided at downstream of the nip portion, to contact and rotate the feed roller 2. The paper carrying performance of the feed roller 2 is deteriorated while the separator element 4 is biased by the elastic element 6. To prevent this, the center (rotary axis position) of the feed roller 2 is movable to position A in which the feed roller 2 contacts the paper plate 3 and the separator element 4 and to position B in which the feed roller 2 is separated from the paper plate 3 and separator element 4, as shown in FIG. 10. Note that the feed roller 2 can be configured to be driven directly without the carrier roller 15.

Further, in FIG. 9 the reflective photosensor 40 is provided at downstream of the nip portion, to detect the position of the paper sheet P carried. The reflective photosensor 40 is disposed so that the bottom surface 41*b* of the circuit board 41 is parallel to the paper sheet P with a distance. When the paper sheet P comes in front of the reflective photosensor 40, the light K from the light emitter 61 is reflected by the paper sheet P and received by the light receiver 65. When the paper sheet P is not in front of the reflective photosensor 40, the light K is not received by the light receiver 65. Thus, the reflective photosensor 40 can detect the position of the paper sheet P in non-contact manner from the receipt or non-receipt of the light K.

In the paper feeding operation of the image forming device 100, first, the feed roller 2 is moved to the position A to extract a single paper sheet P from the paper sheets on the paper plate 3. Along with the rotation of the feed roller 2 and the carrier roller 15, the extracted sheet is carried, and when the reflective photosensor 40 detects the front end of the sheet P passing, a not-shown motor is driven to move the feed roller 2 to the position B. When the reflective photosensor 40 detects the back end of the sheet P passing, the motor is driven to return the feed roller 2 to the position A.

As described above, the image forming device 100 incorporates the above reflective photosensor 40 which requires no additional lens element protruding from the circuit board 41 and can receive a larger amount of light from the light emitter to detect the position of a paper sheet P carried with high accuracy. Because of this, the image forming device 100 according to the present embodiment can be compact in size and reduce erroneous operations.

The above embodiment has described an example of the image forming device with the reflective photosensor. The present invention should not be limited to such an example. The present invention is applicable to any arbitrary device or system as long as it includes a reflective photosensor to detect the position of a target object. Further, the target object should not be limited to a paper sheet. It can be any object detectable by light.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A reflective photosensor to detect a target object, comprising:
    a transparent circuit board;
    a light emitter and a light receiver on one surface of the circuit board, including a light emitting element and a light receiving element, respectively, and disposed so that the light emitting element and the light receiving element face the one surface;
    a concave portion on the other surface of the circuit board, including a first refractive face to oppose the light emitting element and refract light from the light emitting element to the light receiving element and a second refractive face to oppose the light receiving element and refract, to the light receiver, a component of the light refracted by the first refractive face and specularly reflected by the target object.

2. A reflective photosensor according to claim 1, wherein at least one of the first and second refractive faces is formed to converge light.

3. A reflective photosensor according to claim 1, wherein at least one of the light emitter and the light receiver is mounted on the one surface of the circuit board by flip chip bonding.

4. A reflective photosensor according to claim 1, wherein:
    the light emitter is configured to emit infrared light; and
    a sealing resin is layered on the one surface of the circuit board to absorb the infrared light.

5. A reflective photosensor according to claim 1, further comprising
    a shield element provided between the light receiver and the light emitter arranged with an interval.

6. An image forming device comprising:
    a paper container;
    a separator element to separate sheets of paper from the paper container;
    a feed roller to feed a sheet of paper from the paper container;
    a resist roller pair disposed at downstream of the feed roller; and
    the reflective photosensor according to claim 1, disposed between the resist roller pair and a nip portion of the feed roller and the separator element, to detect a position of the sheet of paper fed.

\* \* \* \* \*